Patented Jan. 12, 1932

1,840,385

UNITED STATES PATENT OFFICE

HEINRICH CLINGESTEIN, OF COLOGNE-ON-THE-RHINE, PAUL ZERVAS, OF COLOGNE-MULHEIM, AND HUGO SCHWEITZER, OF LEVERKUSEN-ON-THE-RHINE, GERMANY, ASSIGNORS TO GENERAL ANILINE WORKS, INC., OF NEW YORK, N. Y., A CORPORATION OF DELAWARE

ACID WOOL AZODYESTUFFS

No Drawing. Application filed June 13, 1930, Serial No. 461,048, and in Germany June 14, 1929.

The present invention relates to acid wool dyestuffs, more particularly it relates to dyestuffs which may be represented by the probable general formula

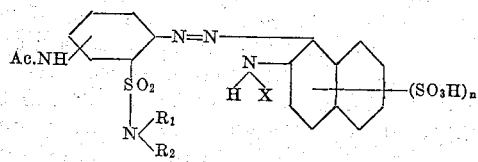

wherein Ac stands for a residue of an aliphatic or an aromatic mono-carboxylic acid, for example for the acetyl- or benzoyl groups, $R_1$ and $R_2$ stand for similar or dissimilar alkyl, phenyl or benzyl groups, such as methyl, ethyl, phenyl, substituted phenyl, benzyl, substituted benzyl etc. $x$ stands for hydrogen or an alkyl group and $n$ stands for one of the numbers 1 and 2 and wherein the naphthalene nucleus may be further substituted for example by alkyl, oxalkyl, hydroxyl.

Our new dyestuffs are obtainable by coupling in acid solution a diazo compound of a monoacyl-phenylene-diamine sulfonic acid-alkyl-, phenyl or benzyl-amide, the free amino group of which is in ortho position to the sulfamino group, with a sulfonic acid of a β-naphthylamine or an N-alkyl derivative thereof. Otherwise our new dyestuffs are obtainable by coupling a nitro-phenylamine sulfonic acid-alkyl-, aryl- or aralkyl-amide the free amino group of which is in ortho position to the sulfamino group, with a sulfonic acid of a β-naphthylamine or N-alkyl-substitution product thereof, reducing the nitro group of the dyestuff thus obtained in alkaline solution and acylating the amino group of the reduced dyestuff. Our new dyestuffs are in form of their alkali metal salts generally dark metallic lustrous powders, easily soluble in water, dyeing wool clear, even red to violet shades of good fastness to light and fulling.

The following examples illustrate our invention, without limiting it thereto:—

*Example 1.*—333 parts by weight of 4-acetylamino-1-amino-benzene-2-sulfo-ethylanilide (colorless crystals melting at 130–131° C., obtainable by reduction and acetylation of 4-nitro-1-aminobenzene-2-sulfoethylanilide) are diazotized with 69 parts by weight of sodium nitrite and hydrochloric acid. The diazo solution is run into an acetic acid solution of 239 parts by weight of 2-amino-8-naphthol-6-sulfonic acid and the reaction to congo red is undone by means of sodium acetate. The isolated dyestuff having in its free state the following formula:—

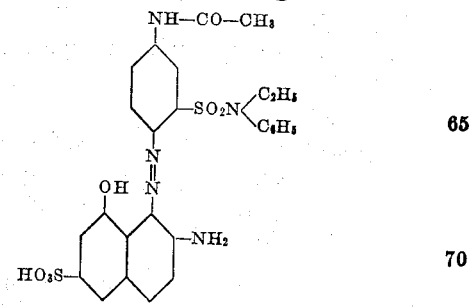

dyes wool from an acid bath a clear blueish red. The dyeings are distinguished by excellent fastness to light and fulling and satisfactory capacity for even dyeing.

*Example 2.*—490 parts by weight of the dyestuff obtained by alkaline reduction of the dyestuff from 4-nitro-1-aminobenzene-3-sulfo-ethylanilide with 2-amino-8-naphthol-6-sulfonic acid (Brit. specification No. 164,218 Example 1) are dissolved in water and 300 parts by weight of acetic acid anhydride are added slowly at about 60° C. with thorough stirring, the reaction mixture being throughout kept weakly alkaline with sodium carbonate. After stirring for about 1 hour at the above temperature and allowing to cool, the isolated dyestuff dyes wool from an acid bath a clear blueish red. The dyestuff is identical with that described in Example 1.

*Example 3.*—333 parts by weight of 4-acetylamino-1-aminobenzene-2-sulfoethylanilide are diazotized with 69 parts by weight of sodium nitrite and hydrochloric acid and coupled in acetic acid solution with 253 parts by weight of 2-methylamino-8-naphthol-6-sulfonic acid. The isolated dyestuff having in its free state the following formula

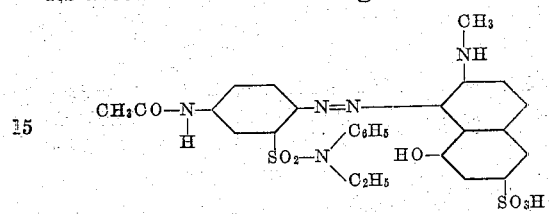

dyes wood from an acid bath a reddish violet.

*Example 4.*—333 parts by weight of 4-acetylamino-1-aminobenzene-2-sulfo-ethyl-anilide are diazotized with 69 parts by weight of sodium nitrite and hydrochloric acid and coupled in acetic acid solution with a solution of 223 parts by weight of 2-naphthylamino-7-sulfonic acid. The isolated dyestuff having in its free state the probable formula

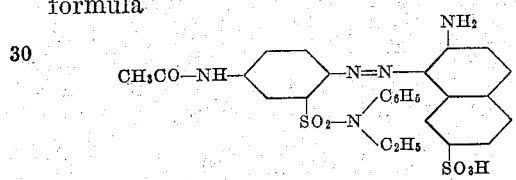

dyes wool red shades.

We claim:—

1. As new compounds azo dyestuffs of the probable general formula

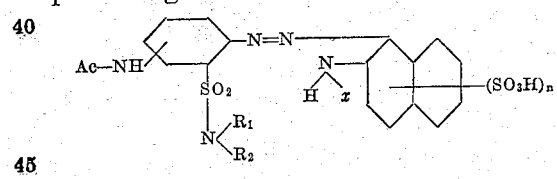

wherein Ac stands for a residue of an aliphatic or an aromatic mono-carboxylic acid, $R_1$ and $R_2$ stand for substituents of the group consisting of alkyl, phenyl and benzyl, $x$ stands for hydrogen or an alkyl group and $n$ stands for one of the numbers 1 and 2 and wherein the naphthalene nucleus may be further substituted by hydroxyl, being in form of their alkali metal salts generally dark metallic lustrous powders, easily soluble in water, dyeing wool clear even red to violet shades of good fastness to light and fulling.

2. As new compounds azo dyestuffs of the probable general formula

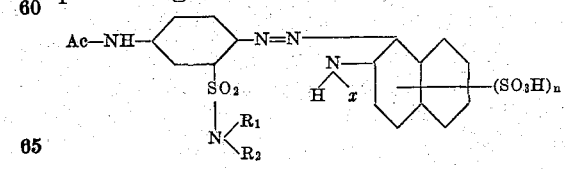

wherein Ac stands for a residue of an aliphatic or an aromatic mono-carboxylic acid, $R_1$ and $R_2$ stand for substituents of the group consisting of alkyl, phenyl and benzyl, $x$ stands for hydrogen or an alkyl group and $n$ stands for one of the numbers 1 and 2 and wherein the naphthalene nucleus may be further substituted by hydroxyl, being in form of their alkali metal salts generally dark metallic lustrous powders, easily soluble in water, dyeing wool clear even red to violet shades of good fastness to light and fulling.

3. As new compounds azo dyestuffs of the probable general formula

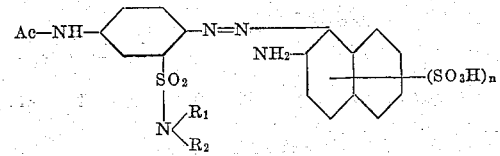

wherein Ac stands for the residue of an aliphatic or an aromatic mono-carboxylic acid, $R_1$ stands for an alkyl group, $R_2$ stands for a benzene nucleus, $n$ stands for one of the numbers 1 and 2 and wherein the naphthalene nucleus may be further substituted by hydroxyl, being in form of their alkali metal salts generally dark metallic lustrous powders, easily soluble in water, dyeing wool clear even red to violet shades of good fastness to light and fulling.

4. As a new compound the azo dyestuffs of the probable formula

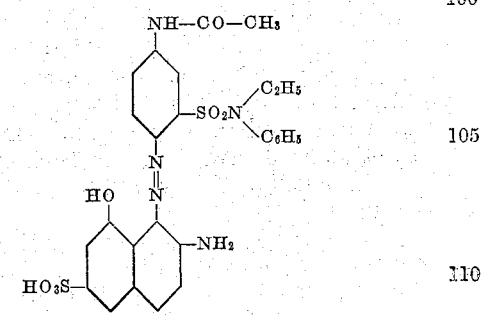

dyeing wool from an acid bath a clear blueish red, the dyeings being distinguished by excellent fastness to light and fulling and satisfactory capacity for even dyeing.

In testimony whereof, we affix our signatures.

HEINRICH CLINGESTEIN.
PAUL ZERVAS.
HUGO SCHWEITZER.